(12) United States Patent
Holzer et al.

(10) Patent No.: US 11,569,866 B2
(45) Date of Patent: Jan. 31, 2023

(54) MAGNET-LESS RING CIRCULATORS FOR FULL DUPLEX DIVISION WIRELESS COMMUNICATION

(71) Applicant: L3HARRIS TECHNOLOGIES, INC., Melbourne, FL (US)

(72) Inventors: Kyle David Holzer, Bountiful, UT (US); Jeffrey S. Walling, Salt Lake City, UT (US)

(73) Assignee: L3HARRIS TECHNOLOGIES, INC., Melbourne, FL (US)

(*) Notice: Subject to any disclaimer, the term of this patent is extended or adjusted under 35 U.S.C. 154(b) by 345 days.

(21) Appl. No.: 16/651,868

(22) PCT Filed: Sep. 25, 2018

(86) PCT No.: PCT/US2018/052753
§ 371 (c)(1),
(2) Date: Mar. 27, 2020

(87) PCT Pub. No.: WO2019/067484
PCT Pub. Date: Apr. 4, 2019

(65) Prior Publication Data
US 2020/0259519 A1    Aug. 13, 2020

Related U.S. Application Data

(60) Provisional application No. 62/563,832, filed on Sep. 27, 2017.

(51) Int. Cl.
*H01P 5/22* (2006.01)
*H04B 1/56* (2006.01)
(Continued)

(52) U.S. Cl.
CPC ............... *H04B 1/56* (2013.01); *H01P 1/38* (2013.01); *H01P 5/22* (2013.01); *H04B 1/525* (2013.01)

(58) Field of Classification Search
CPC .. H01P 5/22; H01P 5/222; H01P 5/225; H01P 5/227; H01P 5/19; H01P 5/12;
(Continued)

(56) References Cited

U.S. PATENT DOCUMENTS

2013/0050012 A1   2/2013  Jungmaier et al.
2013/0300627 A1   11/2013 Sankaran et al.
(Continued)

FOREIGN PATENT DOCUMENTS

WO    2017139012 A2   8/2017
WO    2018226763 A1   12/2018

OTHER PUBLICATIONS

Jungmaier et al. Rat-race based Microstrip Coupler With Differential Port to realize Monostatic RF Systems, 2012, IEEE.*
(Continued)

*Primary Examiner* — Stephen E. Jones
(74) *Attorney, Agent, or Firm* — Workman Nydegger

(57) ABSTRACT

A full duplex communication system comprises a magnet-less ring circulator that comprises a set of ports extending from a circumference of the magnet-less multi-port ring combiner. The set of ports are positioned at increments around the circumference of the magnet-less multi-port ring combiner.

17 Claims, 4 Drawing Sheets

(51) Int. Cl.
*H01P 1/38* (2006.01)
*H04B 1/525* (2015.01)

(58) Field of Classification Search
CPC .... H01P 1/32; H01P 1/387; H01P 1/38; H01P 1/36; H04B 1/56; H04B 1/525
See application file for complete search history.

(56) References Cited

U.S. PATENT DOCUMENTS

2015/0030280 A1    1/2015  Alu et al.
2015/0117281 A1*   4/2015  Khlat ..................... H03H 7/463
                                                          370/297

OTHER PUBLICATIONS

International Search Report dated Feb. 25, 2019 for application PCT/US2018/52753.
Holzer, K et al. "A Multi-Channel Outphasing Ring Combiner for Multi-mode Output and Channel Aggregation"; 2016 46th European Microwave Conference (EuMC), London, 2016; Publication [online]. Oct. 4-6, 2016 [retrieved Dec. 28, 2018). Retrieved from the internet: <URL: https://ieeexplore.ieee.org/document/7824393>.

* cited by examiner

MAGNET-LESS RING CIRCULATORS FOR FULL DUPLEX DIVISION WIRELESS COMMUNICATION

CROSS-REFERENCE TO RELATED APPLICATIONS

This application claims priority to PCT Application No. PCT/US2018/052753 filed on Sep. 25, 2018 entitled "MAGNET-LESS RING CIRCULATORS FOR FULL DUPLEX DIVISION WIRELESS COMMUNICATION" which application claims priority to and the benefit of U.S. Provisional Application Ser. No. 62/563,832 entitled "MAGNET-LESS RING CIRCULATORS FOR FULL DUPLEX DIVISION WIRELESS COMMUNICATION", filed on Sep. 27, 2017, the entire contents of these application are incorporated by reference herein in their entirety.

BACKGROUND

Conventional communication circuits typically utilize separate transmit and receive circuits or alternate between transmitting modes and receiving modes. At least one reason for this separation of the circuits is that a conventional transmitted signal is significantly more powerful than a conventional received signal. Using the same circuit (including antenna) to receive and transmit these respective signals simultaneously can cause the transmitted signal to wholly drown out the smaller received signal.

There is an interest, however, in concurrent full duplex operation of circuits that allows simultaneous operation of a transmitter and a receiver. Such a system could increase communication throughput by a factor of two. As such, there is significant interest in providing systems that are capable of transmitting and receiving signals simultaneously.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include a full duplex communication system that comprises a magnet-less ring circulator. The magnet-less ring circulator comprises a set of ports extending from a circumference of the magnet-less multi-port ring combiner. The set of ports are positioned at $\lambda/4$ increments around the circumference of the magnet-less multi-port ring combiner. A first input port is configured to receive a first input signal and a second input port is configured to receive a second input signal, wherein the first input signal is 180° out-of-phase with the second input signal. A first antenna port is positioned a $\lambda/4$ length away from the first input port and a second antenna port is positioned a $\lambda/4$ length away from the second input port. A receiver output port is positioned a $\lambda/4$ length away from both the first antenna port and the second antenna port.

In at least one embodiment, the full duplex communication system comprises a magnet-less ring circulator that comprises a set of ports extending from a circumference of the magnet-less multi-port ring combiner. The set of ports are positioned at $\lambda/4$ increments around the circumference of the magnet-less multi-port ring combiner.

Additionally, in at least one embodiment, a full duplex communication system comprises a magnet-less ring circulator that comprises at least one input port and at least one receiver output port. The at least one input port and the at least one receiver output port may be positioned at particular $\lambda/4$ increments around a circumference of the magnet-less multi-port ring combiner such that the at least one input port experiences destructive interference at the at least one receiver output port.

Further, in at least one embodiment, a method for communication with a magnet-less ring circulator over a full duplex communication system comprises receiving, at a first input port, a first input signal within a particular frequency spectrum. The method further comprises receiving, at a second input port, a second input signal within the particular frequency spectrum. The first signal may be 180° out-of-phase with the second input signal. Additionally, the method comprises communicating the first input signal and the second input signal to the magnet-less ring circulator. The method also comprises receiving, at a receiver output port, a receiver signal within the particular frequency spectrum. The method additionally comprises communicating the receiver signal to the magnet-less ring circulator. Further, the method comprises broadcasting the first input signal and the second input signal from an emitter that is in communication with the magnet-less ring circulator. Further still, the method comprises processing the receiver signal with a signal processing device in communication with the magnet-less ring circulator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments include magnet-less ring circulators for full duplex division wireless communication. In at least one embodiment, a magnet-less ring circulator provides a system for simultaneously receiving and transmitting signals over the same frequency spectrum. Disclosed embodiments are configurable to mitigate the significant noise associated with the transmitted signal so that a received signal can be received.

In at least one embodiment, high performance circulators are fused to enable full duplex division (FDD) communications with transmit (TX) and receive (RX) signals simultaneously occupying the same frequency spectrum. Due to the large self-interference that the TX presents to the RX, a circulator can be coupled with an active interference cancellation circuit to reduce to mitigate the presence of the interferer. Within conventional systems, ferrite-based magnetic circulators are used to achieve non-reciprocal operation between the TX, RX and antenna. One will appreciate, however, that their large size, high cost, and insertion loss preclude the adoption of ferrite-based magnetic circulators in all but a few applications (e.g., military communications). Disclosed embodiments overcome problems within the conventional systems, including narrow fractional bandwidth and relatively large insertion loss. Furthermore, disclosed embodiments provide greater power handling within a smaller package than is provided by conventional systems.

At least one disclosed embodiment of circulators is able to simultaneously achieve wide bandwidth, high power handling, with small physical dimensions. Additionally, at least one embodiment utilizes a multiway ring combiner, combined with proper signal processing to adjust the signal phasing to achieve an equivalent of the desired non-reciprocal response.

Figure 1:
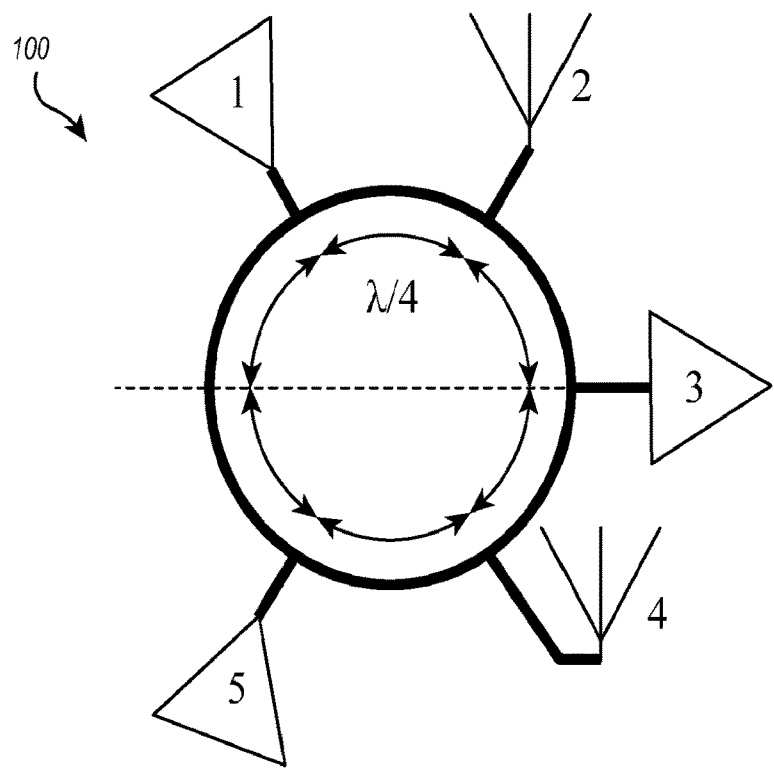
FIG. 1 depicts an embodiment of a magnet-less ring circulator.

In at least one embodiment, the basis for a magnet-less, ring circulator ("MRC") is a 6-port ring combiner. For example, FIG. 1 depicts an embodiment of an MRC 100 that comprises two out-of-phase inputs at ports 1 and 5, respectively, with intended outputs at ports 2 and 4. In at least one embodiment, the transmitter (TX) ports are located at ports 1 and 5, the receiver (RX) port is located at port 3, while output ports for multiple antennas or a combiner are found at ports 2 and 4. Port 6 can be left unpopulated in the MRC 100 and for the sake of clarity is not shown in FIG. 1.

Due to the quarter-wavelength distances between each port, the signals from ports 1 and 5 add out-of-phase at port 3, allowing a receiver to be connected to this port, with suppressed interference from the transmitter. In at least one embodiment, because the MRC 100 is comprised completely of passive elements and achieves high isolation due to signal processing, the MRC 100 has relatively high-power handling capabilities. It is noted that at higher frequencies, the MRC 100 can be integrated directly onto monolithic microwave integrated circuits (MMICs).

In at least one embodiment, the TX ports (ports 1 and 5) are comprised of two properly phased inputs at ports 1 and 5, and an RX path (e.g. LNA) is connected at port 3. TX and RX antennas (not shown) are connected at ports 2 and 4. Further, in at least one embodiment, all scattering matrix products between system interface ports and between antenna ports respectively are nulled. As such, due to destructive phase combination of signal pairs traveling in opposite directions around the ring, a signal entering the ring at input port 1 experiences destructive waveform nulls at ports 3 and 5. The relative port phase relationships for the MRC, disregarding all null paths, is shown below in Table 1.

TABLE I

MRC RELATIVE PORT PHASES

| | | Antenna Ports | |
|---|---|---|---|
| | | 2 | 4 |
| TX/RX Ports | 1 | 90° | 270° |
| | 3 | 90° | 90° |
| | 5 | 270° | 90° |

In at least one embodiment, the MRC 100 allows for simultaneous operation of the TX and RX circuits, but for clarity, operation for each mode will be described separately below, along with the even/odd mode analysis of the MRC.

In at least one embodiment for TX operation, the inputs, which are nominally driven by power amplifiers (PAs), are at ports 1 and 5, while the outputs are at ports 2 and 4. The RX port is located at port 3. When ports 1 and 5 are driven with in-phase signals, they experience undesired destructive summation at ports 2 and 4, and deconstructive summation at port 3. However, if the PAs at ports 1 and 5 are 180° out-of-phase, the signals sum constructively at ports 2 and 4 and deconstructively at port 3, providing a transmission null in the RX path, and enabling high isolation between the TX and RX signals.

Accordingly, in at least one embodiment, a transmission signal may connect to ports 1 and 5 through a phase shift circuit such that ports 1 and 5 are 180° out-of-phase. In at least one embodiment, the 180° phase shift is achieved with a hybrid coupler. This system offers an additional benefit in that power combining the two transmitters allows use of two separate PAs to drive the input ports (e.g., 1 and 5). The ability to use to separate PAs can also allow for the use of lower cost amplifiers, owing to the reduced output power capability of two separate devices rather than one higher power individual device. Additionally, because the devices are physically separated, the heat generated by the PAs is spread out over a wider surface area, hence avoiding localized hot spots and allowing easier cooling for high power amplifiers.

Turning now to an embodiment of the RX operation, the input signal enters the MRC 100 at ports 2 and 4, either via separate antennas, or via a passive combining circuit. These ports are equidistant from the receiver port (e.g., port 3). The signals traversing these paths experience constructive phase combination, hence, the RX signal is a summation of the signals at ports 2 and 4 before it is input to the receiver (e.g., the LNA). As stated above, the out-of-phase transmitter signals from ports 1 and 5 experience a deconstructive phase combination, placing nulls at the receiver port (e.g., port 3). Additionally, the TX signal at port 1 experiences a null at port 5 and the TX signal at port 5 experiences a null at port 1, resulting in isolation of both of the transmitter signals from one another.

The receiver can be used with a passive power combiner and a single antenna, for ease of architecture and design. Alternatively, it can be used with two antennas in a MIMO configuration. In at least one embodiment, if identical antennas are connected to ports 2 and 4, rather than a passive combiner, the systems antenna gain is effectively doubled due to in-phase summation at the receiver port.

In at least one embodiment, TX signals exiting the ring antenna ports 2 and 4 are 180° out-of-phase, respectively, while the RX signals entering are in-phase. This phase differential can produce a pointing angle offset between TX and RX the magnitude being dependent upon the wavelength and relative position of the radiating apertures.

In at least one embodiment, the MRC 100 comprises two independent antennas with mutually exclusive Tx and Rx beam patterns. For example, a wireless system with dedicated Tx and Rx directional antennas with sufficient directional isolation will essentially achieve the same Tx to Rx isolation circulator performance. The MRC 100 duplex system can be constructed with isotropic antennas. The directional Tx and Rx beam patterns are formed with a combination of the relative spacing of the two antennas and the relative phase angle arriving or transmitting from the antenna aperture.

Figure 2:
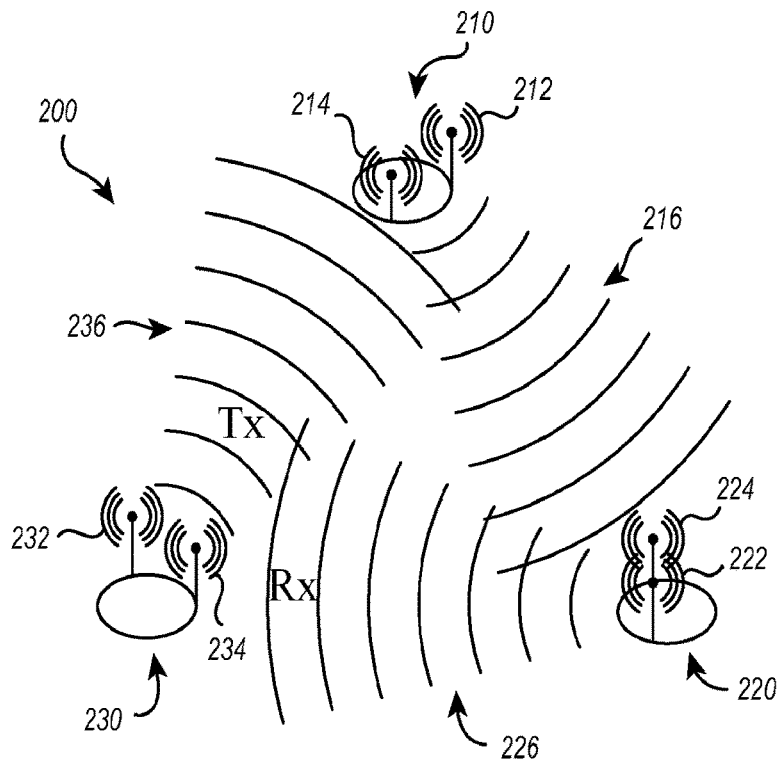
FIG. 2 depicts schematics for an embodiment of a magnet-less ring circulator duplex system.

In at least one embodiment, network communication in the same frequency spectrum can be supported by a number of MRC 100 system configurations. An example of a three-node network 200 is shown in FIG. 2 where the two radiating apertures on each MRC 100 are spaced with n×180° separation. The configuration shown also utilizes a 180° phase difference between the MRC 100 ring and antenna apertures. Duplex communication is enabled when Node #3 becomes a relay point, essentially retransmitting the waveform received from Node #2 at the desired beam angle to be receive by Node #1.

As depicted, in at least one embodiment a first node 210 comprises a first MRC 100 in communication with a first transmitter 212 and a first receiver 214. A second node 220 comprises a second MRC 100 in communication with a second transmitter 222 and a second receiver 224. A third node 230 comprises a third MRC 100 in communication with a third transmitter 232 and a third receiver 234. The first node 210 is configured to simultaneously, over a particular frequency spectrum, receive a third output signal 236 from the third node 230 and transmit a first output signal 216 to the second node 220.

The second node 220 is configured to simultaneously, over the particular frequency spectrum, receive the first output signal 216 from the first node 210 and transmit a second output signal 226 to the third node 230. The third node 230 then simultaneously, over the particular frequency spectrum, receives the second output signal 226 from the second node 220 and transmits the third output signal 236 to the first node 210.

As will be appreciated, such a configuration can act as a relay for duplex communication over a common frequency spectrum. As such, the frequency usage can be doubled by the provided ability to simultaneously receive and transmit data over the common frequency spectrum. One will further appreciate that as used herein, frequency spectrum may also refer to a particular frequency channel.

Figure 4:
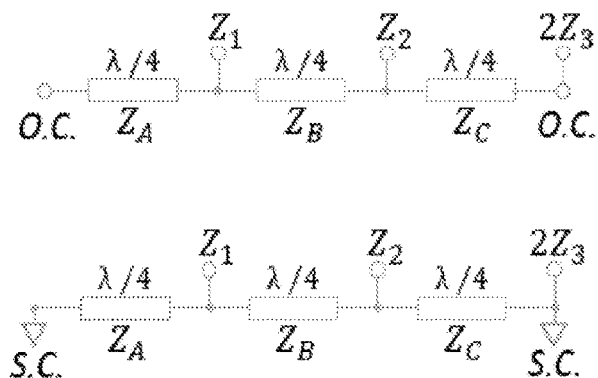
FIG. 4 depicts even and odd mode analysis of an embodiment of a magnet-less ring circulator.

In at least one embodiment, the design of the ring proceeds by properly tuning the impedances of the ring sections to minimize mismatch at the ports. The section impedances can be analyzed using an even-/odd-mode analysis. To simplify the analysis, it is noted that the ring is symmetric, so the circuit can be simplified using a line of symmetry as shown in FIG. 1. The line of symmetry for this ring is taken through the center of the ring, between ports 3 and the unterminated port 6 (not shown) and is annotated by a dotted line. It is noted that the response due to an input at port 5 is the same as that of port 1, by the aforementioned symmetry. The schematics for even- and odd-mode analysis are shown in FIG. 4.

Using transmission line theory, the circuits can be reduced to find the required characteristic impedance of each sub-section, using the expected terminations at $Z_1$, $Z_2$, and $Z_3$, representing the impedances at ports 1, 2 and 3, respectively. This results in the following ideal characteristic impedance values for segments $Z_B$ and $Z_C$:

$$Z_C = \sqrt{2Z_2 Z_3} \quad \text{(Equation 1)}$$

$$Z_B = \sqrt{Z_1 Z_2} \quad \text{(Equation 2)}$$

When all ports are matched to 50Ω the impedance values become $Z_C$=70Ω and $Z_B$=50Ω. To maximize impedance continuity around the ring $Z_A$ is set equal to $Z_B$, though other conditions could be used (e.g. minimize transmission loss, etc.).

To reduce the effects of harmonics, open transmission line stubs can be added to the design in parallel with the output ports such that they present a low impedance for harmonic content at frequencies specified by the wavelength of the stub. Because of the large frequency of the harmonics, the stubs add minimal area overhead. Additionally, they do not offer significant increase in the loss of the fundamental signal. Stubs can be added at any port where the signals are in phase relative to where they are input; hence addition of the traps at ports 2 and 4 is optimal for the TX path. If large out-of-band blockers are problematic for the RX, tuning stubs could be added at these ports to suppress the blocker as well.

Figure 3:
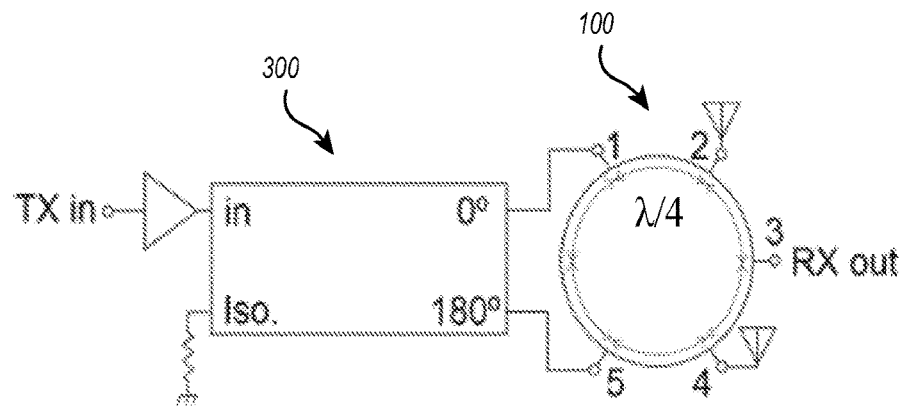
FIG. 3 depicts a schematic for an embodiment of a magnet-less ring circulator.

A schematic of an embodiment of an MRC 100 is shown in FIG. 3. A single input port is divided by a hybrid coupler 300 with a 90° branchline coupler to drive ports 1 and 5 of the ring (e.g., the TX ports). To provide the required 180° phase difference between the ports, an additional 90° delay line is added to the port 5 path. Alternately, power amplifiers can be inserted to drive ports 1 and 5 directly increasing output power, while decreasing the complexity of thermal management for high power amplifiers.

Figure 5:
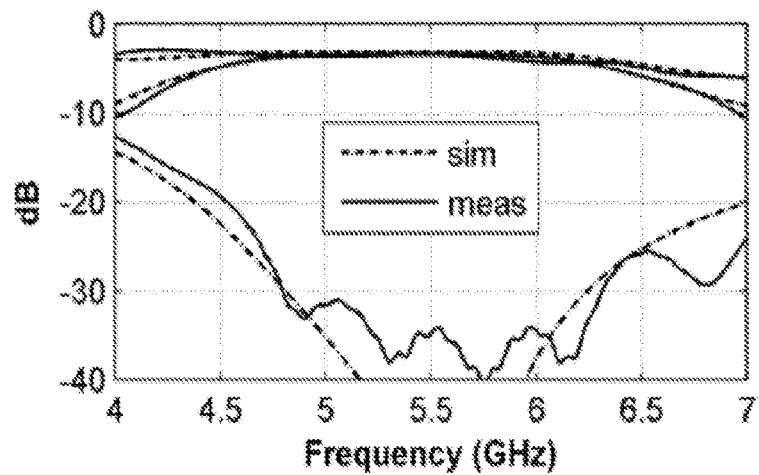
FIG. 5 depicts a chart showing transmit path transmission and isolation of an embodiment of a magnet-less ring circulator.

In at least one embodiment, the functionality of the proposed MRC 100 can be validated with S-parameters that are used to characterize the transmission and isolation. For example, results from a test circuit are compared to the EM simulations of the structure to validate the performance relative to the simulations. The measured and simulated small-signal insertion loss and isolation between the TX and RX paths of the MRC 100 are shown in FIG. 5. The measurements compare favorably with the simulation results and show that the insertion loss between the TX ports (e.g., ports 1 and 5) and the output ports (e.g., ports 2 and 4) is less than 0.48 dB. Adding harmonic traps (not shown) results in an increase in the insertion loss of only 0.2 dB, while reducing the third harmonic content by ~25 dB. The TX-RX isolation is >30 dB across a bandwidth of 1.46 GHz, resulting in a fractional bandwidth of 27%.

Figure 6:
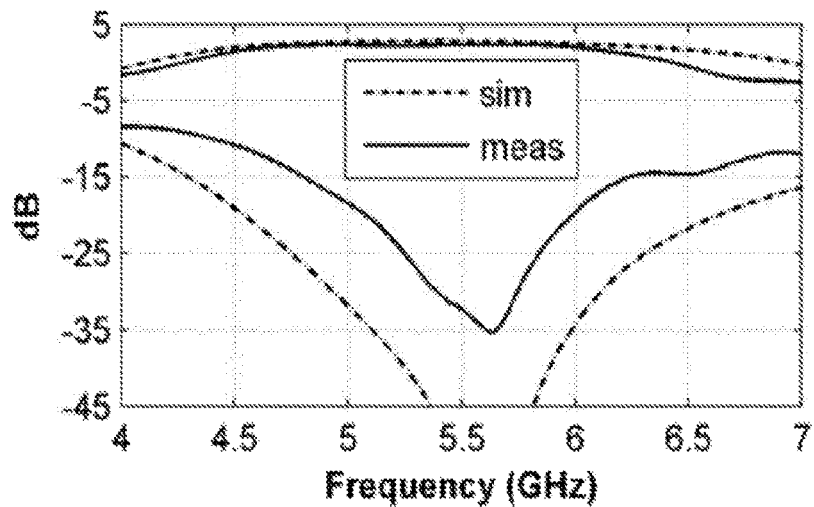
FIG. 6 depicts a chart showing reception path transmission and isolation of an embodiment of a magnet-less ring circulator.

The measured and simulated RX-TX insertion loss and isolation are shown in FIG. 6. Again, the measurements compare favorably with the simulated results. The insertion loss between the input ports (e.g., ports 2 and 4) and the RX port (e.g., port 3) is 0.52 dB. The isolation from the RX port to the TX ports (e.g., ports 1 and 5) is >18 dB across the same bandwidth as the TX-RX isolation. Note that isolation is not as critical in this path, as the leakage from the RX is not likely to affect the PAs driving ports 1 and 5, due to its high impedance and large signal handling capability. The addition of the harmonic traps has similar impact on the RX-TX path as it does on the TX-RX path.

Figure 7:
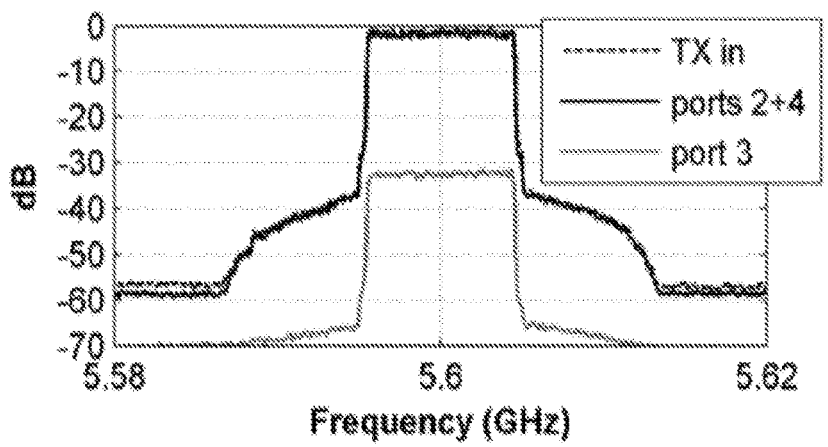
FIG. 7 depicts a chart for an embodiment of a magnet-less ring circulator linearity contribution.

In at least one embodiment, the structure is entirely passive, so the power handling limitations are constrained only by the dimensions of the microstrip transmission lines, primarily limited by the designed characteristic impedance of the ring and the physical dimensions of the PCB or integrated circuit technology. To demonstrate the isolation between the TX and RX ports with a wideband modulated signal, a 10 MHz, 64 QAM LTE signal from a 35 W amplifier is input to the TX ports (port 1 and 5), via the hybrid coupler. The power available at ports 2, 3 and 4 is measured at a frequency of 5.6 GHz, as shown in FIG. 7. The measured isolation matches well with the small-signal isolation, achieving >30 dB of rejection at the RX port, compared to the output ports.

Figure 8:
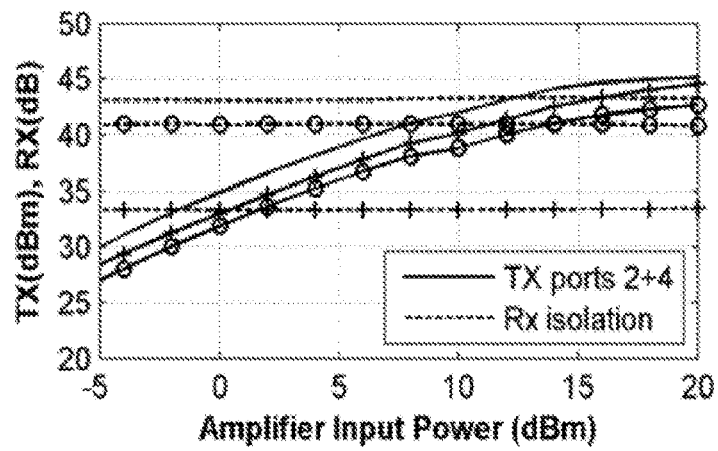
FIG. 8 depicts a chart showing transmission and reception isolation of an embodiment of a magnet-less ring circulator.

To verify the power handling capability of the MRC, the input power is swept over the frequency range of the combiner. The amplifier remains linear up to its saturated output power level of 45 dBm, as shown in FIG. 8. Because the structure is completely passive, the only limitation is the power handling capability of the RX front-end that is placed at port 3. The isolation across frequency closely matches the small-signal performance.

Accordingly, an MRC 100 topology is disclosed that achieves a measured 27% fractional bandwidth for TX-RX isolation greater than 30 dB. Disclosed embodiments comprise completely passive, non-magnetic circulators that achieve the highest power handling and fractional bandwidth. The size, power handling, insertion loss and bandwidth of the presented MRC 100 are superior to the compared circulators; Of note is that the combiner scales with frequency, offering future benefits for integrated MMICs for future Ka-band MIMO integration and beyond.

One will appreciate that the present invention can also be described in terms of methods comprising one or more acts for accomplishing a particular result. For example, FIG. 9 and the corresponding text illustrates a flowchart of a sequence of acts in a method for communicating with a magnet-less ring circulator over a full duplex communication system. The acts of FIG. 9 are described below with reference to the components and modules illustrated in FIGS. 1-8.

Figure 9:
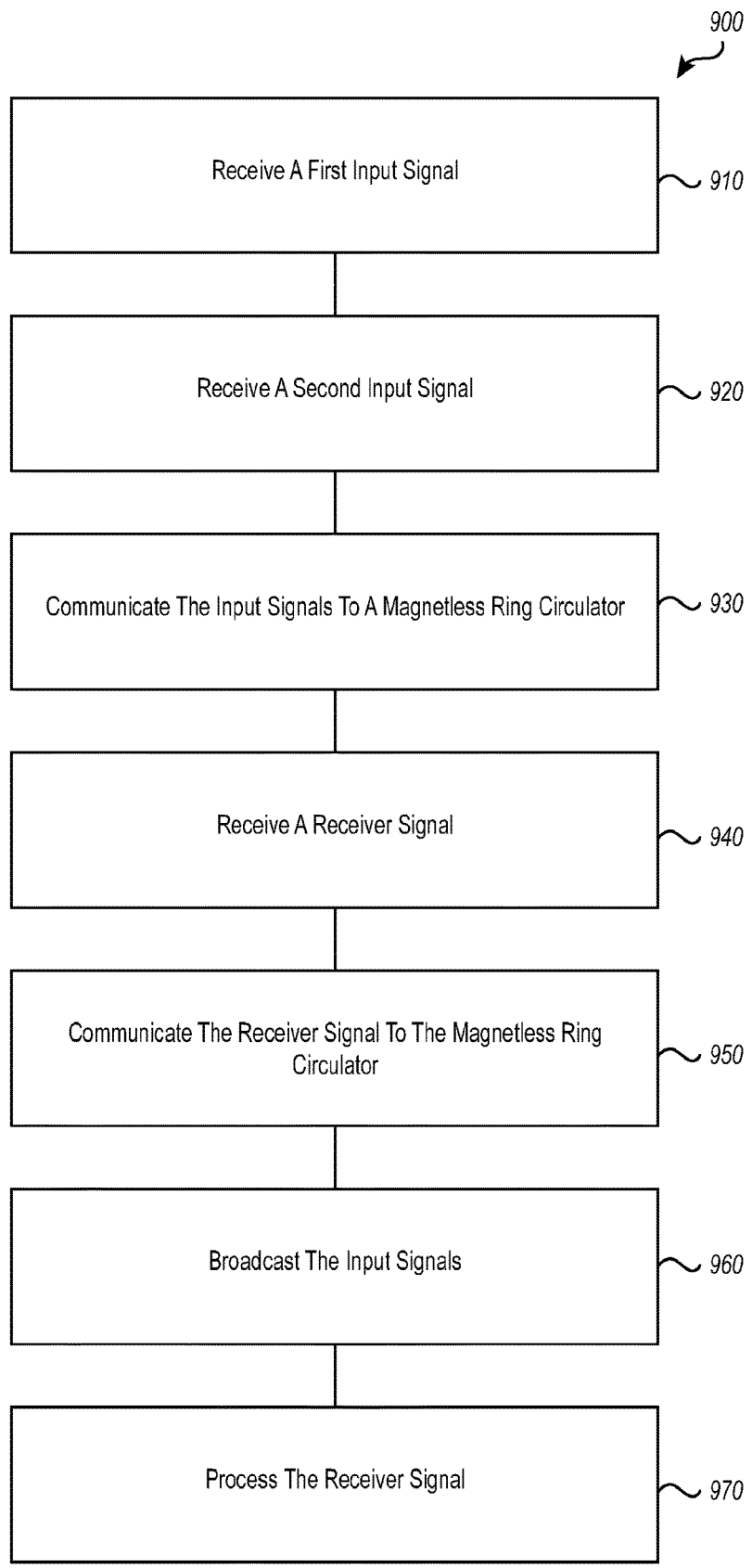
FIG. 9 depicts a flow chart of steps within a method for communicating with a magnet-less ring circulator over a full duplex communication system.

For instance, FIG. 9 illustrates that a method 900 for communicating with a magnet-less ring circulator over a full duplex communication system includes an act 910 of receiving a first input signal. Act 910 comprises receiving, at a first input port, a first input signal within a particular frequency spectrum. For example, an input signal may be sent through a hybrid coupler 300 or directly into a first input port (e.g., port 1). The input signal may be associated with a particular frequency.

Additionally, method 900 includes an act 920 of receiving a second input signal. Act 920 comprises receiving, at a second input port, a second input signal within the particular frequency spectrum, wherein the first signal is 180° out-of-phase with the second input signal. For example, an input signal may be sent through a hybrid coupler 300 or directly into a second input port (e.g., port 5). The input signal may be associated with a particular frequency. Additionally, the hybrid coupler 300 may shift the signal at the second input port (e.g., port 5) 180° out-of-phase with respect to the signal at the first input port (e.g., port 1).

Method 900 also includes an act 930 of communicating the input signals to the magnet-less ring circulator. Act 930 comprises communicating the first input signal and the second input signal to the magnet-less ring circulator. For example, the first and second input signals may be sent through a hybrid coupler 300 into the MRC 100 through ports 1 and 5.

Method 900 then includes an act 950 of communicating a receiver signal to the magnet-less ring circulator. For example, antennas connected to Ports 2 and 4 can receive a receiver signal and communicate the receiver signal into the MRC 100.

In addition, method 900 includes an act 940 of receiving a receiver signal. Act 940 comprises receiving, at a receiver output port, a receiver signal within the particular frequency spectrum. For example, the receiver signal is communicated directly to the receiver output port (e.g., Port 3) for processing.

Further, method 900 includes an act 960 of broad-casting the input signals. Act 960 includes broadcasting the first input signal and the second input signal from an emitter that is in communication with the magnet-less ring circula-tor. For example, Port 2 and Port 4 may be in communication with antennas (or a single antenna). Signals receives by the input ports (e.g., Ports 1 and 5) may be broadcast through antennas connected to Ports 2 and 4.

Further still, method 900 includes act 970 of processing the receiver signal. Act 970 comprises processing the receiver signal with a signal processing device in communication with the magnet-less ring circulator. For example, the receiver signal may be within the same frequency spectrum as the input signals and may be received simultaneously as the input signals. Nevertheless, the MRC 100 is configured to be able to engage in duplex communication by processing signals received at the receiver port 3.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A full duplex communication system comprising:
   a magnet-less ring circulator comprising a set of ports extending from a circumference of the magnet-less multi-port ring combiner, wherein the set of ports are positioned at $\lambda/4$ increments around the circumference of the magnet-less multi-port ring combiner; and
   wherein the set of ports comprises:
      a first input port connected to a first transmitter;
      a second input port connected to a second transmitter;
      a first antenna port connected to a first antenna;
      a second antenna port connected to a second antenna; and
      a receiver output port connected to a receiver.

2. The full duplex communication system as recited in claim 1, wherein the receiver output port is positioned a $\lambda/4$ length away from both the first antenna port and the second antenna port.

3. The full duplex communication system as recited in claim 1, wherein the first input signal at the first input port is 180° out-of-phase with a second input signal at the second input port.

4. The full duplex communication system as recited in claim 1, further comprising a hybrid coupler in communication with both the first input port and the second input port.

5. The full duplex communication system as recited in claim 1, wherein the first antenna port is positioned a $\lambda/4$ length away from the first input port.

6. The full duplex communication system as recited in claim 5, wherein the first antenna port is positioned a $\lambda/4$ length away from the receiver output port.

7. The full duplex communication system as recited in claim 1, wherein the second antenna port is positioned a $\lambda/4$ length away from the second input port.

8. The full duplex communication system as recited in claim 7, wherein the second antenna port is positioned a $\lambda/4$ length away from the receiver output port.

9. A full duplex communication system comprising:
a magnet-less ring circulator comprising at least one input port and at least one receiver output port, wherein the at least one input port and the at least one receiver output port are positioned at particular $\lambda/4$ increments around a circumference of the magnet-less multi-port ring combiner such that the at least one input port experiences destructive interference at the at least one receiver output port;
wherein the at least one input port comprises:
a first input port configured to receive a first input signal; and
a second input port configured to receive a second input signal
a first antenna port; and
a second antenna port.

10. The full duplex communication system as recited in claim 9, wherein the at least one receiver output port is positioned a $\lambda/4$ length away from both the first antenna port and the second antenna port.

11. The full duplex communication system as recited in claim 9, wherein the first input signal is 180° out-of-phase with the second input signal.

12. The full duplex communication system as recited in claim 9, wherein the first antenna port is positioned a $\lambda/4$ length away from the first input port.

13. The full duplex communication system as recited in claim 9, further comprising a hybrid coupler in communication with both the first input port and the second input port.

14. The full duplex communication system as recited in claim 9, further comprising:
a first node comprising the magnet-less ring circulator in communication with a first transmitter and a first receiver;
a second node comprising a second magnet-less ring circulator in communication with a second transmitter and a second receiver; and
a third node comprising a third magnet-less ring circulator in communication with a third transmitter and a third receiver,
wherein the first node is configured to simultaneously, over a particular frequency spectrum, receive a third output signal from the third node and transmit a first output signal to the second node.

15. The full duplex communication system as recited in claim 14, wherein:
the second node is configured to simultaneously, over the particular frequency spectrum, receive the first output signal from the first node and transmit a second output signal to the third node.

16. The full duplex communication system as recited in claim 15, wherein:
the third node is configured to simultaneously, over the particular frequency spectrum, receive the second output signal from the second node and transmit the third output signal to the first node.

17. A method for communication with a magnet-less ring circulator over a full duplex communication system comprising:
receiving, at a first input port, a first input signal within a particular frequency spectrum;
receiving, at a second input port, a second input signal within the particular frequency spectrum, wherein the first signal is 180° out-of-phase with the second input signal;
communicating the first input signal and the second input signal to the magnet-less ring circulator;
communicating a receiver signal to the magnet-less ring circulator;
receiving, at a receiver output port, the receiver signal within the particular frequency spectrum;
broadcasting the first input signal and the second input signal from an emitter that is in communication with the magnet-less ring circulator via a first antenna port and a second antenna port; and
processing the receiver signal with a signal processing device in communication with the magnet-less ring circulator.

* * * * *